United States Patent [19]
Fujii

[11] Patent Number: 5,118,461
[45] Date of Patent: Jun. 2, 1992

[54] FLOW RATE MEASURING APPARATUS

[75] Inventor: Takao Fujii, Yokohama, Japan

[73] Assignee: Kabushiki Kaisha Toshiba, Kawasaki, Japan

[21] Appl. No.: 480,830

[22] Filed: Feb. 16, 1990

[30] Foreign Application Priority Data

Feb. 17, 1989 [JP] Japan .................................. 1-36073

[51] Int. Cl.$^5$ .......................................... G21C 17/10
[52] U.S. Cl. .................................. 376/246; 376/210; 376/215
[58] Field of Search .................. 376/246, 210, 215; 73/861

[56] References Cited
U.S. PATENT DOCUMENTS

| | | | |
|---|---|---|---|
| 4,108,720 | 8/1978 | Sato | 376/210 |
| 4,440,715 | 4/1984 | Sato et al. | 376/210 |
| 4,467,657 | 8/1984 | Olsson | 73/861 |
| 4,478,783 | 10/1984 | Broadwater | 376/211 |
| 4,632,802 | 12/1986 | Herbst | 376/216 |
| 4,777,009 | 10/1988 | Singh | 376/211 |
| 4,821,580 | 4/1989 | Jorritsma | 73/861 |

FOREIGN PATENT DOCUMENTS

| | | | |
|---|---|---|---|
| 58-10692 | 1/1983 | Japan . | |
| 60-32152 | 7/1985 | Japan . | |
| 61190 | 3/1988 | Japan | 376/246 |
| 163297 | 7/1988 | Japan | 376/246 |

Primary Examiner—Brooks H. Hunt
Assistant Examiner—Frederick H. Voss
Attorney, Agent, or Firm—Oblon, Spivak, McClelland, Maier & Neustadt

[57] ABSTRACT

In an apparatus including a fluid circulation unit for allowing a fluid in a container to be circulated along a passage in the container, a flow rate measuring apparatus includes a rotational speed transducer for detecting the rotational speed of a motor for driving the fluid circulation unit and a pipe network model calculator for receiving a rotational speed signal from the rotational speed transducer. The model calculator has an initially programmed pipe network model corresponding to flows in the container and calculates the flow rate at a corresponding location of the model with the rotational speed of the circulation unit replaced by constants of the model and hence calculates a flow rate of the fluid at that location in a real passage.

4 Claims, 7 Drawing Sheets

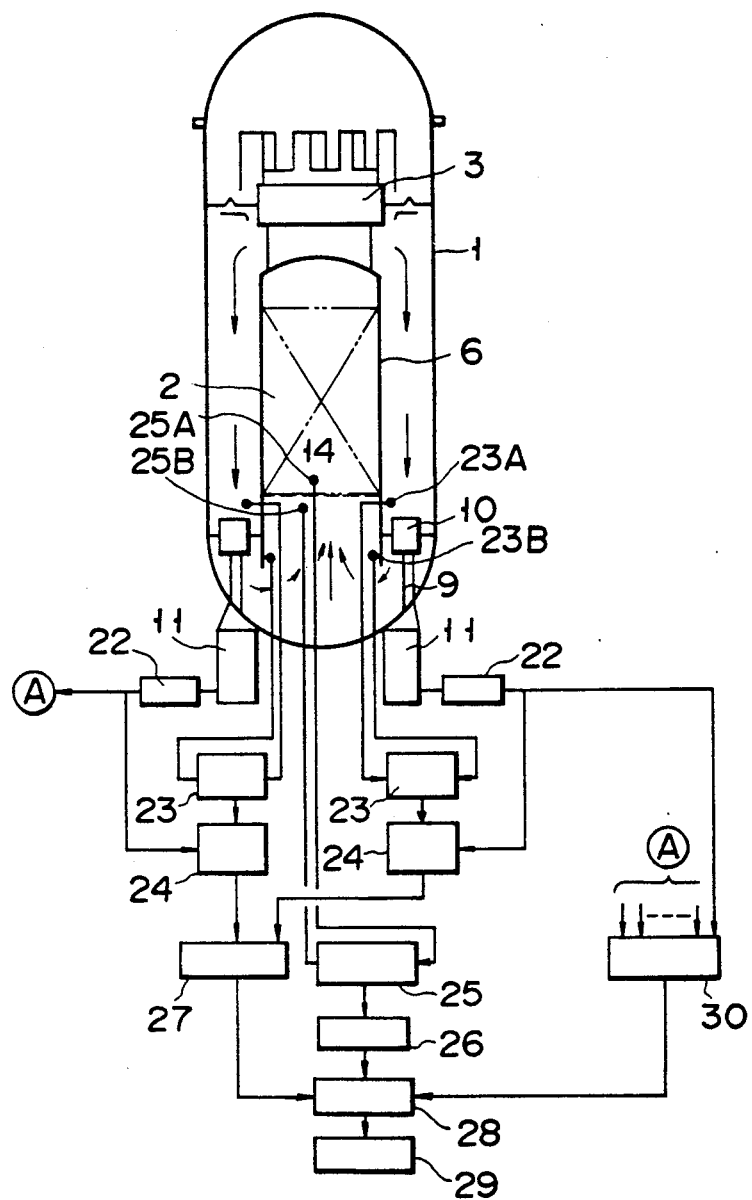
F I G. 3

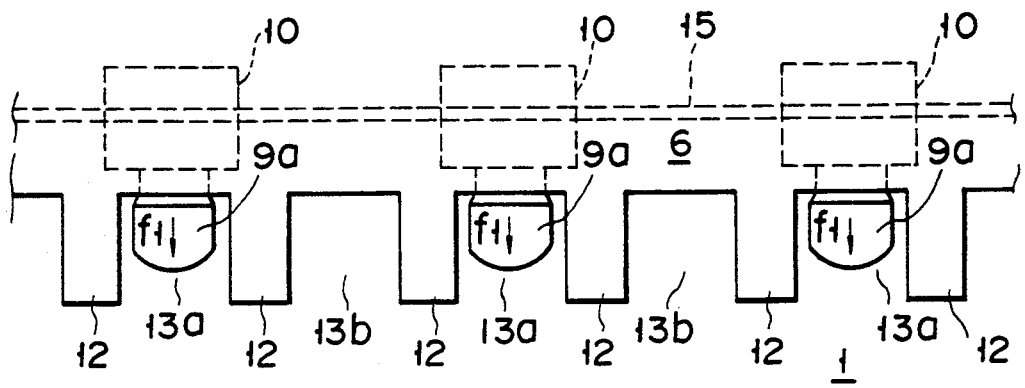
F I G. 4
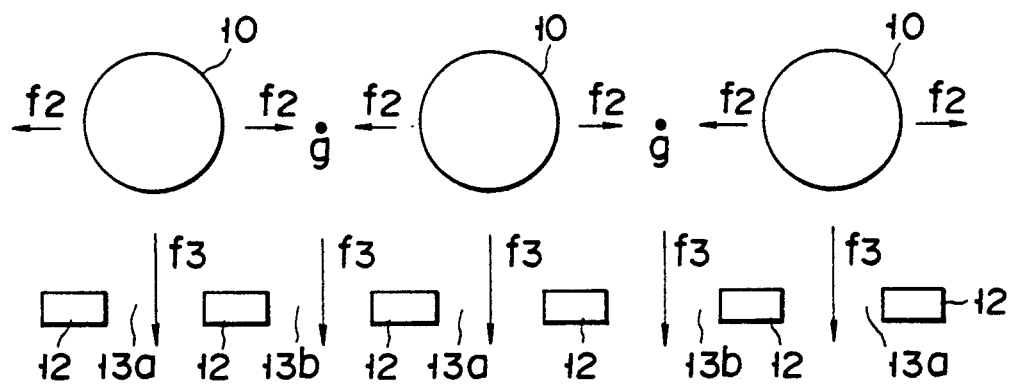
F I G. 5

FLOW RATE MEASURING APPARATUS

BACKGROUND OF THE INVENTION

1. Field of the Invention

The present invention relates to a flow rate measuring apparatus for measuring a flow rate of a fluid which is flowing in a tank by a plurality of pumps and, in particular, to an apparatus for accurately measuring a flow rate of a coolant, by a plurality of circulation pumps, in a pressure vessel in an nuclear reactor.

2. Description of the Related Art

In a boiling-water reactor a coolant in a pressure vessel is circulated, by a plurality of circulation pumps, in the pressure vessel past a reactor core and it is necessary to accurately measure a flow rate, as well as a flow distribution, of the coolant circulated in the pressure vessel past the core and monitor the state of the reactor at all times.

A general structure of a conventional boiling-water reactor and means for measuring a flow rate of the coolant will be explained below with reference to FIG. 1. The reactor contains a pressure vessel 1 with a core 2 held therein. The core 2 is held within a shroud 6 and a steam separator 3 is arranged over the shroud 6 to separate water from a steam generated at the core and supply it as dried steam to a turbine, etc. A coolant separated from the steam flows down a passage, defined between the outer periphery of the shroud 6 and the inner wall of the pressure vessel 1, onto a location under the core 2 by a plurality of circulation pumps 10 and goes up from under the core 2 into the core where it flows out of its upper zone after being boiled. The coolant circulates in such a passage as set forth above. The circulation pumps 10 are each driven, by the corresponding motor 11 outside the pressure vessel, through the corresponding shaft 9.

In this type of reactor, it is necessary to precisely measure a flow rate of the coolant into the core and monitor the state of the reactor. A conventional means for measuring a flow rate of a coolant is so arranged as will be set forth below.

Openings 25A, 25B of pipes for a plurality of sets of core plate differential pressure gauges 25 are opened at the inlet 14 of the core 2 and located at a core support plate or at an entrance nozzle of a fuel assembly. Pressure signals corresponding to pressure at these openings are sent to a differential pressure/flow converter 26 so that a flow rate of the coolant is measured.

A plurality of pump differential pressure gauges 23 are also provided to correct and back up the core inlet differential pressure gauges 25. Openings 23A, 23B of pipes for the pump section differential pressure gauge 23 are provided at the suction and discharge sides, respectively, of the respective circulation pump 10. A differential pressure gauge 23 is inputted to a pump section calculator 24. The rotational speed of the motor 11 for driving the circulation pump 10 is measured by the corresponding speed transducer 22 and a speed signal output from the speed transducer 22 is inputted to the pump section calculator 24. With a differential pressure between the suction and discharge ports and the rotational speed of the pumps as parameters, relations between these parameters and the pump discharge are obtained in advance, using a test stand, for the respective circulation pump 10 and also have been programmed into the pump section calculator 24. The flow rate of the coolant through the pump 10 is calculated by the pump section calculator 24 and the respective circulation pump's flow rate output signal is gained from the pump section calculator 24 and inputted to a calculator 27 where a total flows rate of all the circulation pumps is obtained.

A flow rate output signal of the calculator 27 and that of the differential pressure/flow rate rate calculator 26 are fed to an operation monitor device 29 of the reactor through a correction switch 28. By the switching operation of the correction switch 28, it is possible to make a readjustment of the core plate differential pressure gauge 25 and, in the case of an functional failure of this core differential pressure line, provide a backup function.

A line of the aforementioned pump deck differential pressure gauge 23 reveals lowered accuracy in the case of a temporary stoppage, or a partial operation, of the circulation pumps 10. The reason for this will be explained below with respect to FIGS. 2A and 2B.

FIGS. 2A and 2B are modified cross-sectional views showing a pressure vessel 1 at a height level where circulation pumps 10 are located. Reference numeral 12 in FIGS. 2A and 2B shows a cylindrical support leg 12 for a shroud with leg openings 13 located in front of the respective circulation pump 10 and also located at a middle area of respective adjacent circulation pumps.

FIG. 2A shows a case in which all the circulation pumps 10 are operated with equal rotating speed with a coolant flowing in the directions indicated by open arrows in FIG. 2A. In this case, some of the discharge from the respective circulation pump 10 flows directly from the leg opening 13 which is in front of the respective circulation pump into a lower plenum and a remaining portion of the discharge from the respective circulation pump 10 horizontally flows in a circumferential direction. The latter coolant flow and a coolant flow coming from the next adjacent circulation pump meet at the middle area of both the pumps and flow into the lower plenum through the leg opening 13 which is located between the circulation pumps.

FIG. 2B shows a case in which some circulation pump (for example, a circulation pump 10B) is out of service and the other circulation pumps 10A are operated with equal rotating speed, a coolant flowing in the directions indicated by solid arrows in FIG. 2B. In this case, the discharge flowing in the circumferential direction from the neighboring pumps 10A located at both side of the idle pump 10B flow toward the discharge side of the idle pump 10B. Some of the coolant flowing toward the discharge side flows into the lower plenum through the leg opening 13 in front of the idle pump 10B and others flow backward via the idle pump 10B. Even if, in this case, the flow rate of the discharge from the individual operating pumps are summed up it is not possible to accurately calculate a flow rate of coolant through the core.

Although a simpler case has been explained above in conjunction with FIG. 2B for ease in understanding, some of circulation pumps may, in practical case, be stopped or a plurality of circulation pumps may be operated with different rotating speed. It has been difficult, in such a complicated case, to measure a flow rate of coolant precisely.

The aforementioned problem arises upon the exact measurement of a flow rate of coolant in the pressure vessel in the reactor as well as in other apparatus and chemical plants. In a heat exchanger, a boiler, a agitating apparatus in a chemical plant, a dialyzer, a gas reaction apparatus, a solid/fluid separation apparatus etc, a complex fluid flow/circulation passage is formed inside of vessel and a fluid flow through the passage. Even in these apparatuses, it is difficult to exactly measure the state of a fluid flow in the vessel in an off-normal operational condition and there is a growing demand for an apparatus of accurately measuring a flow rate of a complex fluid flow in a vessel, or a container, as in the aforementioned nuclear reactor.

SUMMARY OF THE INVENTION

It is accordingly the object of the present invention to provide a flow measuring apparatus which, in an apparatus for flowing a fluid in a vessel or container, by a fluid circulation unit, along a predetermined passage in the vessel or container, accurately measures a flow rate of such a fluid even if the fluid flows in a flow pattern deviated from a normal one.

According to the present invention, a rotational speed detectional unit detects the rotational speed of a motor for driving a fluid circulation unit and delivers a corresponding rotational speed signal to a pipe network calculation unit which is stored with an initially programmed pipe network model equivalent to a real passage of the fluid in the container. The pipe network constants are set corresponding to the fluid circulation unit on the pipe network model to a value corresponding to the rotational speed of the motor for driving the fluid circulation unit, and analytically calculates a flow rate at any point on the pipe network model, from this result it is possible to measure a flow rate of the fluid at corresponding point in the container.

Since the present apparatus derives a flow rate on the pipe network with the flow passage in the container replaced as the pipe network model, it is possible to simply and accurately calculate an actual flow rate at any portion of the passage in the container. Even if the passage of the fluid in the container is complicated or a plurality of fluid circulation means are located in the passage, it is possible to simply and accurately calculate the flow rate at any portion of in the passage in the container.

According to a preferred embodiment of the present invention, the present invention is advantageously applied to an apparatus which measures a flow rate of a coolant circulated in a pressure vessel for a boiling-water reactor in particular. The pressure vessel contains a core, a shroud, shroud support legs and so on, by which a passage is formed to allow the coolant to circulate by circulation pumps. That passage is not of such a type as to be surrounded completely with a wall and hence of a complex type in flow pattern so that the circulation of the coolant is conducted by a plurality of circulation pumps. These pumps cause a back-flow upon being partially stopped, resulting in a complicated pattern of a coolant flow in the pressure vessel. It is thus difficult to measure a actual flow of the coolant at any portion in the pressure vessel. In the measurement of a flow rate in the pressure vessel of the reactor, according to the present invention, a pipe network model is prepared based on the actual passage of the coolant in the pressure vessel with the rotating speed of the corresponding circulation pump replaced with corresponding variables of the pipe network model and a coolant flow is calculated based on the pipe network model whereby it is possible to simply and accurately measure a flow rate of the coolant in the pressure vessel.

According to another preferred embodiment of the present invention, a result of measurement is fed back to a circulation unit, for example, to a control unit of the circulation pump in the reactor and, by so doing, it is also possible to automatically maintain a flow rate of a coolant in the reactor at a predetermined level. According to this kind of correction, therefore, one or some of circulation pumps are operated at a low rotating speed or stopped, a drop in the flow rate of the coolant is measured, corresponding of the result, the rotating speed of other circulation pumps are increased automatically in accordance with a result and maintain the flow rate of the coolant through the core at a predetermined normal level. It is thus possible to enhance the reliability of the operation and the control of the reactor plant.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

The embodiments of the present invention will be explained below with reference to the accompanying drawings.

FIG. 3 is a diagrammatic view showing a boiling-water reactor including a flow measuring apparatus according to a first embodiment of the present invention;

FIG. 4 is a side view, as viewed internally, showing a shroud support leg of the reactor of FIG. 1 and a circulation pump area;

FIG. 5 is a plan view diagrammatically showing the circulation pump area of FIG. 4 which defines coolant flows;

DETAILED DESCRIPTION OF THE PREFERRED EMBODIMENTS

The first embodiment of the present invention will be explained below with reference to FIGS. 3 to 7.

Figure 1:
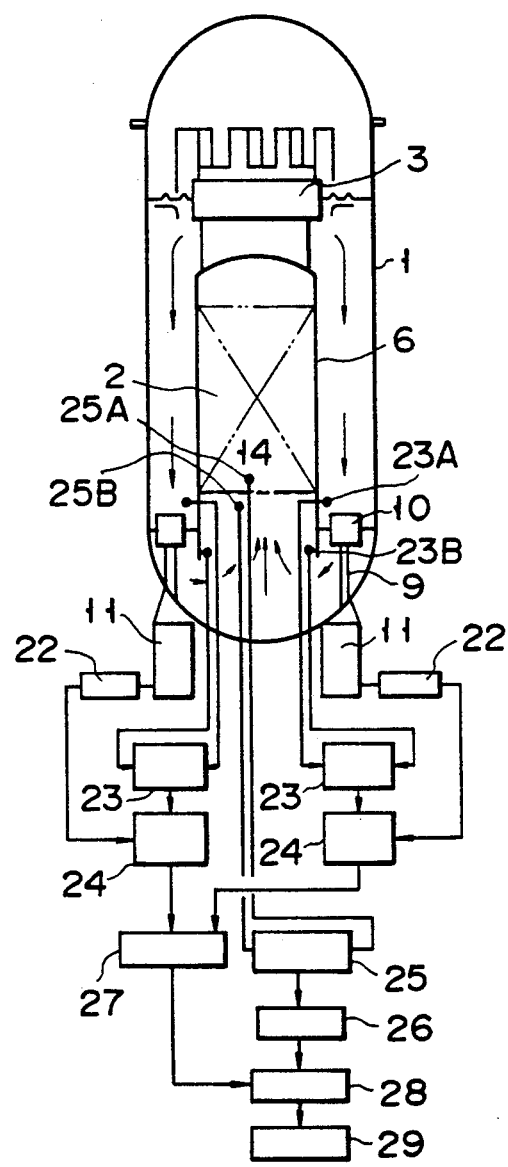
FIG. 1 is a diagrammatic view showing a flow measuring apparatus for measuring a flow of a coolant in a conventional boiling-water reactor.
Figure 2A:
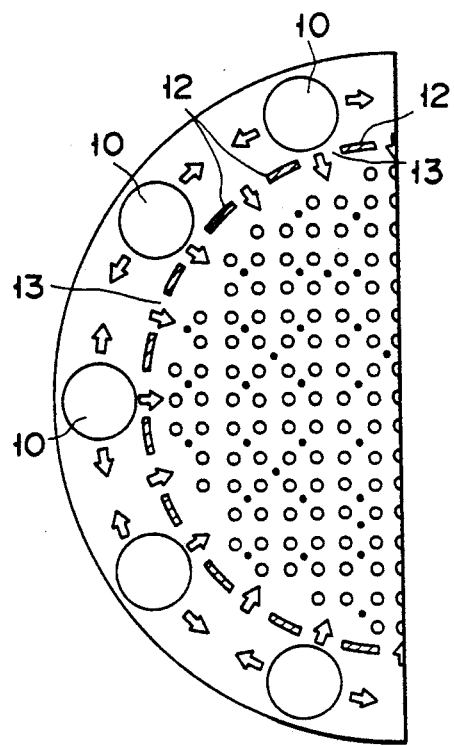
FIG. 2A is a partial, horizontal cross-sectional view showing circulation pumps at a height level which are arranged in the reactor of FIG. 1 with arrows representing the state of a coolant flow in a normal operation of the circulation pumps.
Figure 2B:
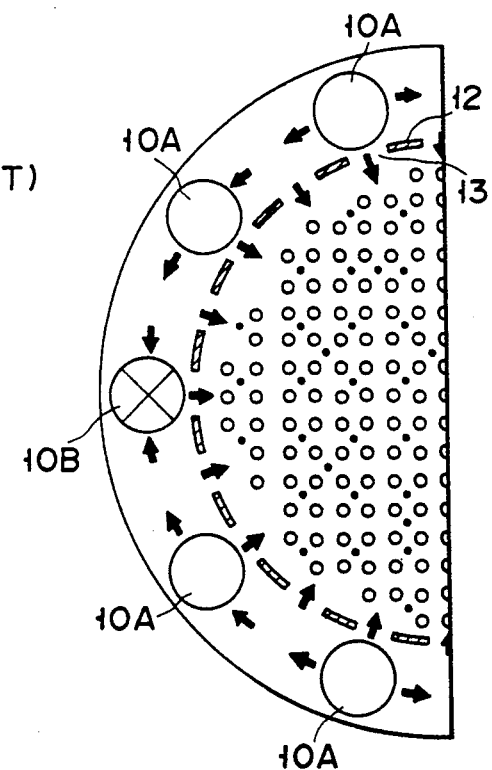
FIG. 2B is a partial, horizontal cross-sectional view showing circulation pumps at a height level which are arranged in the reactor of FIG. 1 with one of the pumps shown being stopped, arrows in FIG. 2B representing the state of a coolant flow.

FIG. 1 is a diagrammatic view showing a boiling-water reactor including a flow measuring apparatus according to the first embodiment of the present invention. The reactor includes a pressure vessel 1 with a reactor core 2 held therein. The core 2 is held within a shroud 6 and a steam separator 3 is provided over the shroud 6. The steam separator separates water or coolant from a steam generated at the core 2 and supplies dried steam to a turbine, not shown, and so on. A coolant separated from the steam flows down a passage, defined between the outer periphery of the shroud 6 and the inner wall of the pressure vessel 1, and is sent by a plurality of circulation pumps 10 to a location under the core 2. That coolant goes from below the core 2 up into the core 2 where it is bold. It is flowed out from above the core. In this way, the coolant circulates through the passage as set forth above. The circulation pumps 10, each, are driven, through a shaft 9, by a corresponding motor 11 which is mounted outside the pressure vessel.

A coolant flow measuring means is provided in the reactor so as to accurately measure a flow rate of a coolant past the core and its flow distribution and monitor the state of the reactor.

Openings 25A, 25B of pipes for a plurality of sets of core inlet differential pressure gauges 25 are provided at the core inlet 14 of the reaction core 2. These openings of the pipes are located at a core support plate of the reactor core 2 or at an entrance nozzle of a fuel assembly. Pressure signals corresponding to pressures at these openings are supplied to a differential pressure/flow converter 26 so that the flow rate of the coolant may be measured. Although in the arrangement shown in FIG. 3 the core inlet only, a plurality of systems are provided as the core inlet differential pressure gauge in a practical reactor.

A plurality of additional pump section differential pressure gauges 23 are also provided to correct and back up the aforementioned core inlet differential pressure gauges 25 The pump section differential pressure gauge 23 is provided for each circulation pump. The present invention is applied to the systems for the pump section differential pressure meters 23.

The openings 23A and 23B of the pipes for each pump section differential gauge meter are provided at the suction and discharge sides, respectively, of the respective circulation pump 10. A differential pressure signal is output from the pump section differential pressure gauge 23 and input to a pump section calculator 24. A speed transducer 22 measures the rotational speed of the motor 11 for driving the circulation pump 10. A speed signal is output from the speed transducer 22 and input to the pump section calculator 24. With the differential pressure between the suction and discharge sides and rotational speed of the pump 10 as parameters, a relation of these parameters and pumps' discharges are obtained in advance using a test stand for each circulation pump and also have been programmed in the pump section calculator 24. Thus the flow rate of the respective circulation pump 10 is measured by the pump section calculator 24. A flow signal for the respective circulation pump is output from the pump section calculator 24 and input to a calculator 27 so as to obtain a total flow rate of all the circulation pumps.

A flow signal of the calculator 27 and that of the differential pressure/flow calculator 26 are input via a correction switch 28 to an operation monitor device 29 for the reactor. By the switching operation of the correction switch 28 it is possible to correct and back up the core plate differential pressure gauge 25 in the case of functional failure of this core plate differential pressure line.

The speed transducer 22 for measuring the rotational speed of the motor 11 for driving the circulation pump 10 delivers a rotation speed signal to a pipe network model calculator 30. In the case where one or some of the circulation pumps 10 are stopped or driven at a lower rotational speed, the calculator 30 calculates a total of the flow rate of all the circulation pumps 10.

A pipe network model equivalent to coolant flows in the pressure vessel 1, for example, flows from the respective circulation pumps 10 to a lower plenum is initially programmed in the calculator 30. A relation of pipe network model to the aforementioned flows will be explained below.

FIG. 4 is a side view showing an area including the circulation pumps and FIG. 5 is a plan view diagrammatically showing that area. FIG. 4 is a side view as viewed from inside a zone below the shroud 6 and at shroud support leg 12. Below a passage defined between the outer periphery of the lower portion of the shroud 6 and the inner wall of the pressure vessel 1 a ring-like pump deck 15 is located in a manner to close that passage. A plurality of circulation pumps 10 are arranged in a circumferential direction at equal intervals with each penetrating the pump deck 15. A nozzle 9a is provided at lower end of each circulation pump 10 and a coolant is sucked from a suction inlet at the upper end of the circulation pump 10 and discharged from the nozzle 9a. The lower end of the shroud 6 is supported by a cylindrical shroud support leg 12. Leg openings 13a are provided at the shroud support leg 12 with each provided at a location opposite to the front of circulation pump 10 and leg openings 13b are provided at a middle position between the adjacent circulation pumps 10.

FIGS. 4 and 5 show the state of flows of a coolant discharged form the circulation pumps 10. A coolant flow $f_1$ discharged from the nozzle 9a of the circulation pump 10 is divided into a circumferential flow $f_2$ and a radial flow $f_3$. The coolant flow $f_3$ is into the lower plenum past the leg opening 13a. The flow $f_2$ and a flow $f_2$ coming from the adjacent circulation pump meet at a point g to provide a radial flow $f_3$. The radial flow $f_3$ is into the lower plenum past the leg clearance 13b.

Figure 6:
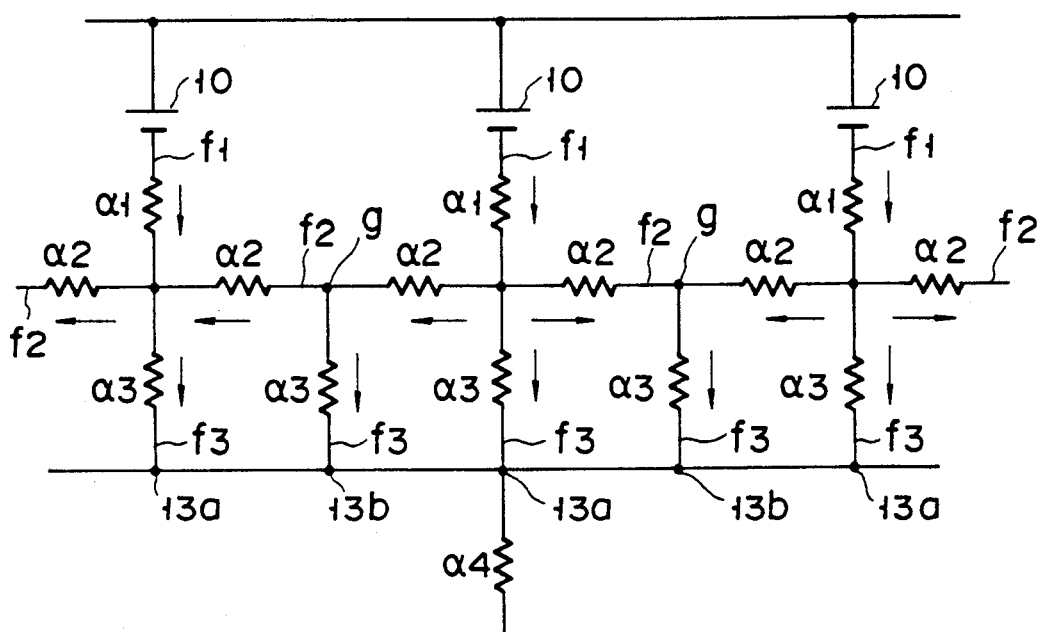
FIG. 6 is a view showing a pipe network model corresponding to the coolant flows shown in FIG. 5.

FIG. 6 shows a coolant flow pattern as a pipe network model. In the model thus prepared, the pipes corresponding to the flows in FIGS. 4 and 5 and branch points are represented by identical signs and the flow resistances of the respective pipes (flows) are denoted by $\alpha_1$, $\alpha_2$, $\alpha_3$ and $\alpha_4$ in FIG. 6.

The model thus prepared is initially programmed into the pipe network model calculator 30. On the model, the respective flows are analytically calculated based on the rotational speed signals of the pumps entered into the model calculator 30 from the speed transducer 22 and the result of calculation (flow rate signal) is input to the correction switch 28. The correction switch 28 selectively switches the flow rate signal of the calculator 27 or that of the calculator 30, as required, to the operation monitor device 29. The correction of the signal of the calculator 27 and system back-up of the calculator 27 are performed by the signal of the model calculator 30.

The analytical calculation as set out above will be explained below in more detail with reference to FIG. 7.

Figure 7:
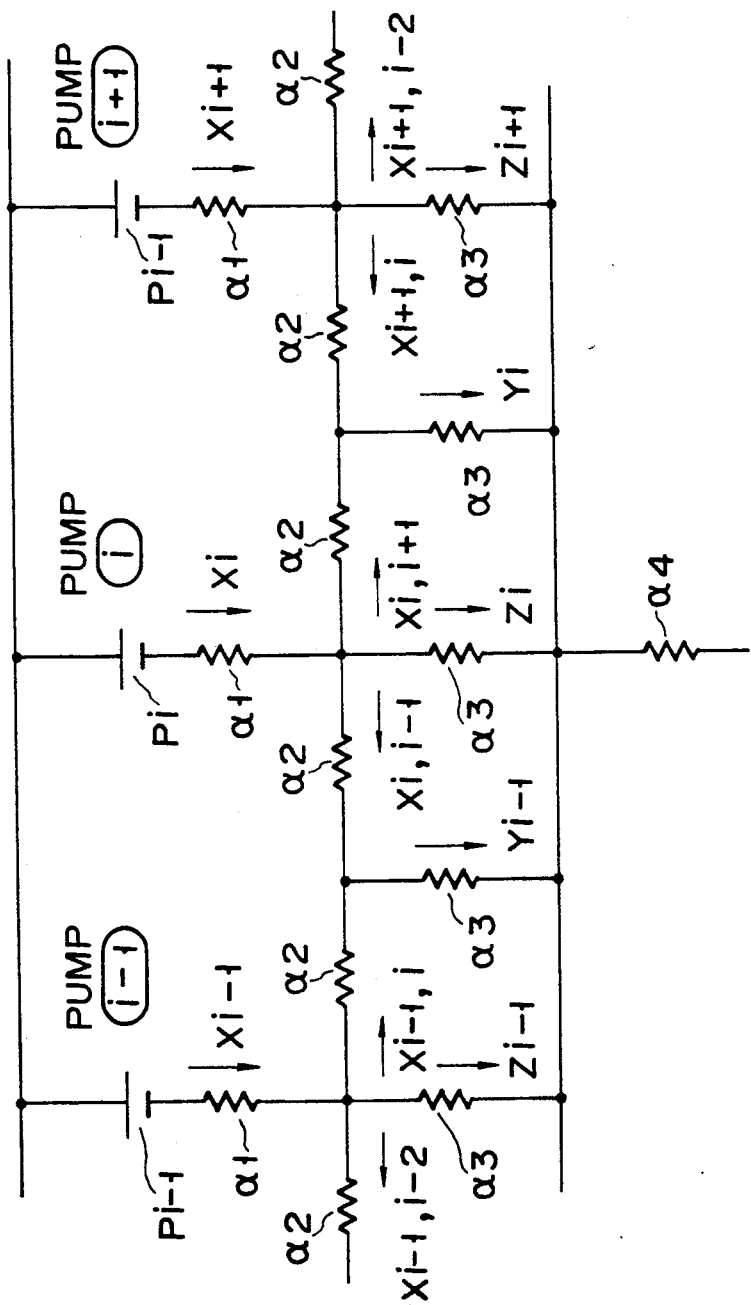
FIG. 7 is a view for explaining the state of flows on the pipe network model of FIG. 6.

In FIG. 7, Pi-1, and Pi and Pi+1 correspond to the respective circulation pumps 10 and represent the Q-H characteristics (including back-flow characteristics) of the respective circulation pumps. Here Q and H represent the flow rate of the pump and pressure loss (loss head), respectively.

The symbols $\alpha_1$, $\alpha_2$, $\alpha_3$ and $\alpha_4$ represent pipe resistances, $\alpha_1$ showing the discharge loss of the respective pumps (a loss involved upon the collide of the coolant discharged down from the pumps against the bottom of the pressure vessel 1), $\alpha_2$ a loss between the respective pumps, $\alpha_3$ a loss at the shroud support leg 12 and $\alpha_4$ a pressure loss in the reactor (various losses suffered by the coolant returned back to the pumps 10 past the core 2, though there may be a change with time).

X, Y, Z in FIG. 7 represent the flows of the respective locations.

Analytically solving a multi-dimensional simultaneous nonlinear equation formulated, under the condition (1) of constant flows rate at the respective nodes (branch points) as well as under the condition (2) under which a given relation is obtained for the respective pipe pressure, using the model as shown in FIGS. 6 and 7 yields the respective flows X, Y and Z. That is, based on the condition.

(1) Under which the flow rate of the coolant into the respective node (branch point) is equal to that discharged from that node, $$\sum_{i=1}^{m} q_i = 0 \quad (1)$$

provided that qi shows a suction flow rate or a discharge of the respective pipes 1,2,...m connected to the respective nodes and (2) under which the algebraic sum of the pressure losses (loss heads) is equal to zero in which if, with the pressure loss of the respective pipe represented by hi, hi>0 when the flow is in a clockwise direction and hi<0 when the flow is in a counterclockwise direction, then $$\sum_{i=1}^{m} h_i = 0 \quad (2)$$

provided that m denotes the number of unit pipes for one element pipe, the nonlinear simultaneous equation for the respective nodes is prepared and the respective flows are found by analytically solving that simultaneous equation.

That is, in the various operation states of the respective circulation pumps (including a back-flow with some pump not operated), respective constants (an equivalent pipe resistance and pump's back-flow characteristic) of the pipe network model are initially found using the pump section differential pressure meter 23 and stored in the model calculator 30. If the respective flows rate are analytically found using these constant values and the flow rate through the core is corrected using the core inlet differential pressure gauge, then the accuracy with which the coolant is circulated through the core can remarkably be enhanced irrespective of whether or not the circulation pumps 10 are rotated at equal rotational speed. Even if any hindrance occurs for some reason or other upon the measuring of the flow rate by the core inlet differential pressure gauge 25, it is possible to maintain a requisite measuring accuracy even upon the measuring of the flow rate by the model calculator 30 only.

By optimizing (recorrecting) the value of the respective constant of the model either periodically or at a proper time at the aforementioned steps, an adequate preparation can adjustably be made against a variation in the pressure loss in the core with time, for example, at the end of a fuel cycle, thus maintaining the measurement of the flow with high accuracy.

Since the requisite accuracy is obtained upon the measurement of the flow rate by the model calculator 30, a system thus obtained can be simplified at low cost. It is only necessary to send the rotational speed data of the respective pump from the corresponding speed transducer 22 mounted on the corresponding drive motor 11 of corresponding circulation pump 10 to the model calculator 30 and then find the respective flows rate from the rotational speed of the pumps (some somewhat varying at its rate) and both the Q-H characteristic inherent in the respective pump and respective constant of the pipe network model which has initially been found and stored as already set out above. The flow rate thus found is displayed on the operation monitor device 29.

It may be possible to use both the measurement of the flow rate by the model calculator 30 and the measurement of the flow rate by either the differential pressure at the core inlet section or the differential pressure in the inlet and outlet of the circulation pump 10.

Since the flow rate measuring apparatus of the present invention is applied to the flow rate measuring apparatus for measuring a coolant flow rate in the boiling-water reactor, it is possible to readily and accurately control the operation of the reactor and to achieve high reliability with which the reactor is controlled.

Figure 8:
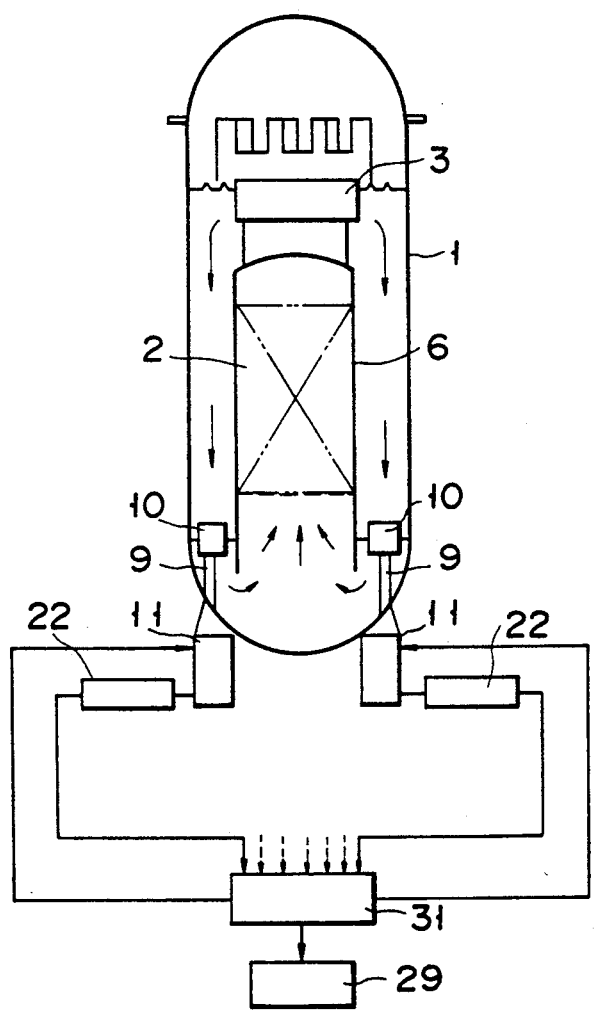
FIG. 8 is a diagrammatic view showing a flow measuring apparatus according to a second embodiment of the present invention.

FIG. 8 shows an apparatus according to a second embodiment of the present invention. The second embodiment includes a control unit 31 with a pipe network calculator 30 incorporated therein. A speed transducer 22 detects the rotational speed of the respective circulation pump and sends it to the control unit 31. In FIG. 8, the speed transducer 22, though being shown as being two in number, is provided for each motor of the respective circulation pump. The control unit 31 calculates the flow rate of a coolant as in the aforementioned embodiment and sends a control signal to the corresponding motor 11 of the respective circulation pump, thus controlling the operation of the circulation pump 10 and hence a circulation coolant flow. It is to be noted that the control unit 31 delivers a position control signal of a control rod and other signals so that it is possible to control the core output and the operation of a whole reactor.

Although in the aforementioned embodiment the present invention has been explained as being applied to the apparatus for measuring a flow rate of a circulation coolant in the pressure vessel for the boiling water reactor, it is not restricted to the aforementioned embodiment.

In a heat exchanger, a boiler, an agitating apparatus in a chemical plant, a dialyzing apparatus, a gas reactor, a solid/fluid separator and so on, a complex flow/circulation passage is formed in a container or vessel through which a fluid flows. Even in the apparatuses, it has been difficult to accurately measure the state of the flow of a fluid in the container when these apparatuses are operated under an off-normal condition. There is a growing demand for an apparatus for precisely measuring a flow rate of a fluid in the container (vessel) in a complicated flow pattern as in the case of the flow rate measuring apparatus of the present invention. If the flow rate measuring apparatus of the present invention is applied to the various apparatuses, the flow rate of the fluid in proper location or locations in the container can readily and accurately be measured, and the aforementioned apparatuses can be managed or controlled exactly and very reliably

What is claimed is:

1. A flow measuring apparatus for coolant flow in a boiling-water-reactor which is composed of a pressure vessel; the pressure vessel containing a core, a shroud and a shroud support leg; coolant circulation internal pumps being located in a flow path defined between the outer peripheries of the shroud and shroud support legs and the inner wall of the pressure vessel; and the shroud support leg having a plurality of leg openings, said apparatus comprising:

rotational speed detecting means for detecting the rotational speed of the internal pumps;

pipe network model calculation means for receiving a rotational speed signal from the rotational speed detecting means and for calculating a flow rate of the coolant at any portion of the flow path on the basis of the rotational speed signal, said model calculation means initially storing a program for a closed pipe network model, corresponding to a flow from a pump outlet of the internal pump the the core, and said model calculation means being responsive to the rotational speed signal to set constants for the model and analytically calculate a flow rate of the coolant at any required portion of that model; and control means for controlling at least one of a coolant flow and a control rod position to control an output power of the reactor, said control means containing said pipe network model calculation means and controlling an output power of the reactor on the basis of a flow signal from the model calculation means.

2. A flow measuring apparatus for coolant flow in a boiling-water-reactor which is composed of a pressure vessel; the pressure vessel containing a core, a shroud and a shroud support leg; coolant circulation internal pumps being located in a flow path defined between the outer peripheries of the shroud and shroud support legs and the inner wall of the pressure vessel; and the shroud support leg having a plurality of leg openings, said apparatus comprising:

rotational speed detecting means for detecting the rotational speed of the internal pump;

pipe network model calculation means for receiving a rotational speed signal from the rotational speed detecting means and for calculating a flow rate of the coolant at any portion of the flow path on the basis of the rotational speed signal, said model calculation means initially storing a program for a closed pipe network model, corresponding to a flow from a pump outlet of the internal pump to a corresponding leg opening, a flow from the pump outlet of the internal pump to a middle point between two adjacent internal pumps in the passage and a flow from the middle point to the leg openings, and said model calculation means being responsive to the rotational speed signal to set constants for the model and analytically calculate a flow rate of the coolant at any require portion of that model; and control means for controlling at least one of a coolant flow and a control rod position to control an output power of the reactor, said control means containing said pipe network model calculation means and controlling an output power of the reactor on the basis of a flow signal from the model calculation means.

3. The flow measuring apparatus according to claim 2, wherein said pipe network model programmed in said pipe network model calculation means is prepared by using $\alpha_1$, $\alpha_2$, $\alpha_3$ and $\alpha_4$ as flow resistances of corresponding closed pipe network of the model with respective flow/pressure loss characteristics of n number of the internal pumps as differential pressure Pn on those locations of the model corresponding pumps, where $\alpha_1$: a discharge loss of the nozzle of the internal pump;

$\alpha_2$: a pressure loss involved from the nozzle section to a middle point between it and two internal pumps in the passage;

$\alpha_3$: a pressure loss at the location of the leg opening; and $\alpha_4$: a pressure loss at the core and the lower plenum.

4. The flow measuring apparatus according to claim 2, wherein the pipe network model calculation means comprises a plurality of pump deck differential pressure gauges detecting a differential pressure between suction and discharge sides of the internal pump; speed meters detecting the number of rotations of a respective motor for driving the internal pump; pump section calculation means for receiving a differential pressure signal output from the pump section differential pressure gauge and a rotational speed signal output from the speed transducer, for calculating, from initially measured internal pump characteristics, a discharge of each internal pump on the basis of both the signals, and for calculating a total flow rate of coolant summing up discharges of the pumps; and a pipe network model calculating means, programmed in advance, for receiving a rotational speed signal from each speed transducer, for calculating a flow rate of the coolant from the rotational speed signal, and for delivering a result of calculation as an output so as to adjust and back up the pump section calculation means.

* * * * *